(12) United States Patent
Patel et al.

(10) Patent No.: US 9,870,173 B2
(45) Date of Patent: Jan. 16, 2018

(54) APPARATUS AND METHOD FOR OPTIMIZED N-WRITE/1-READ PORT MEMORY DESIGN

(71) Applicant: CAVIUM, INC., San Jose, CA (US)

(72) Inventors: Saurin Patel, San Jose, CA (US); Weihuang Wang, Los Gatos, CA (US)

(73) Assignee: CAVIUM, INC., San Jose, CA (US)

( * ) Notice: Subject to any disclaimer, the term of this patent is extended or adjusted under 35 U.S.C. 154(b) by 154 days.

(21) Appl. No.: 15/047,987

(22) Filed: Feb. 19, 2016

(65) Prior Publication Data

US 2017/0242624 A1    Aug. 24, 2017

(51) Int. Cl.

| | |
|---|---|
| *G06F 13/00* | (2006.01) |
| *G06F 3/06* | (2006.01) |
| *G06F 12/0802* | (2016.01) |
| *G06F 13/42* | (2006.01) |
| *G06F 12/127* | (2016.01) |
| *G06F 12/06* | (2006.01) |
| *G06F 12/02* | (2006.01) |

(52) U.S. Cl.
CPC ............ *G06F 3/0659* (2013.01); *G06F 3/067* (2013.01); *G06F 3/0611* (2013.01); *G06F 3/0683* (2013.01); *G06F 12/0223* (2013.01); *G06F 12/0623* (2013.01); *G06F 12/0802* (2013.01); *G06F 12/127* (2013.01); *G06F 13/4256* (2013.01); *G06F 13/4273* (2013.01); *G06F 13/4291* (2013.01)

(58) Field of Classification Search
CPC ...... G06F 3/0611; G06F 3/067; G06F 3/0659; G06F 3/0683; G06F 12/0223; G06F 12/0623; G06F 12/0802; G06F 12/127; G06F 13/4256; G06F 13/4273; G06F 13/4291
USPC ............ 711/151, 154, 158, 165; 710/20, 52; 712/206, 223, 248
See application file for complete search history.

(56) References Cited

U.S. PATENT DOCUMENTS

| | | | |
|---|---|---|---|
| 2006/0179183 A1* | 8/2006 | Brittain | G06F 13/161 710/35 |
| 2008/0301256 A1* | 12/2008 | McWilliams | G06F 12/0284 709/214 |
| 2017/0083326 A1* | 3/2017 | Burger | G06F 9/3004 |

* cited by examiner

*Primary Examiner* — Reba I Elmore
(74) *Attorney, Agent, or Firm* — Duane Morris LLP; David T. Xue

(57) ABSTRACT

An optimized design of n-write/1-read port memory comprises a memory unit including a plurality of memory banks each having one write port and one read port configured to write data to and read data from the memory banks, respectively. The memory further comprises a plurality of write interfaces configured to carry concurrent write requests to the memory unit for a write operation, wherein the first write request is always presented by its write interface directly to a crossbar, wherein the rest of the write requests are each fed through a set of temporary memory modules connected in a sequence before being presented to the crossbar. The crossbar is configured to accept the first write request directly and fetch the rest of the write requests from one of the memory modules in the set and route each of the write requests to one of the memory banks in the memory unit.

20 Claims, 4 Drawing Sheets

APPARATUS AND METHOD FOR OPTIMIZED N-WRITE/1-READ PORT MEMORY DESIGN

BACKGROUND

Memories such as n-write/1-read port type of memories are at the core of network switches/switching units in any communication network. An n-write/1-read port memory typically include a memory unit of a certain size comprising a plurality of memory banks/modules, multiple (n) write ports/interfaces through which a plurality of pipelines may write to the memory, and one read interface through which data may be read from the memory. Here, each memory bank can be of certain size/depth (e.g., 4 k) accessible by a memory address and of certain width, which is the number of (e.g., 40) data bits at each memory address. For a non-limiting example, the data at each memory address can be a counter associated with the specific memory address.

During operation, multiple pipelines may try to concurrently access the memory via the write interfaces, wherein each of the pipelines carries a data packet to update/increment the data (e.g., counter) at a specific memory address. Under such a scenario, there may be competition or conflict among the pipelines since they may all attempt to access the same memory bank/location at the same time. Although it is possible to replicate and include in the memory multiple (instead of only one) memory units so that each of the multiple write interfaces may have its own dedicated memory unit to avoid such conflict, such memory replication may result in an increase in size of the overall memory design. For example, N memory units would be needed to accommodate N write interfaces, which cause problem for the memory design when N becomes large.

The foregoing examples of the related art and limitations related therewith are intended to be illustrative and not exclusive. Other limitations of the related art will become apparent upon a reading of the specification and a study of the drawings.

SUMMARY

An optimized design of n-write/1-read port memory comprises a memory unit including a plurality of memory banks each having one write port and one read port configured to write data to and read data from the memory banks, respectively. The memory further comprises a plurality of write interfaces configured to carry concurrent write requests to the memory unit for a write operation, wherein the first write request is always presented by its write interface directly to a crossbar, wherein the rest of the write requests are each fed through a set of temporary memory modules connected in a sequence before being presented to the crossbar. The crossbar is configured to accept the first write request directly and fetch the rest of the write requests from one of the memory modules in the set and route each of the write requests to one of the memory banks in the memory unit.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

DETAILED DESCRIPTION

Figure 1:
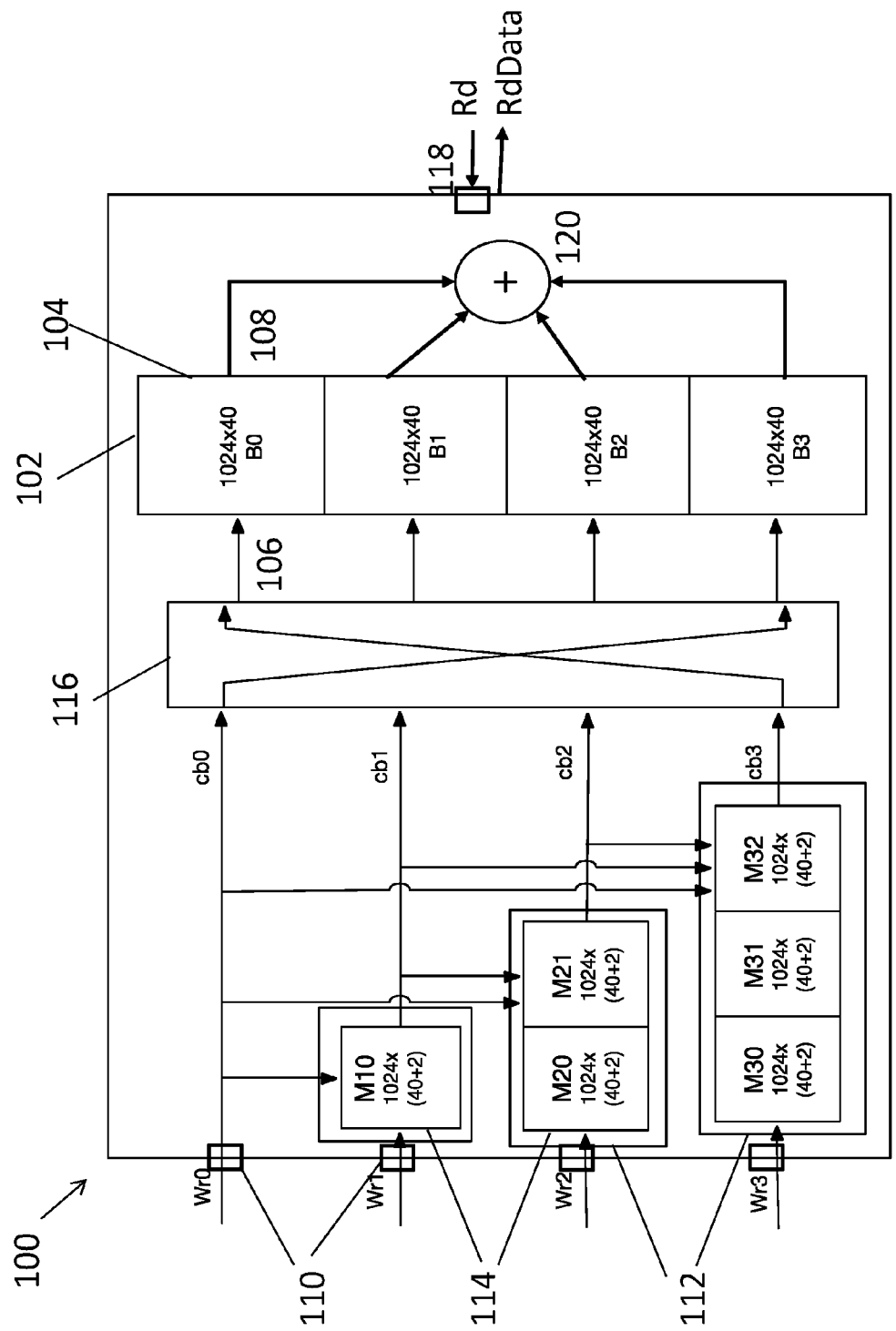
FIG. 1 illustrates an example of a top-level block diagram of an optimized design of n-write/1-read memory with buffered write requests in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates an example of a top-level block diagram of an optimized design of n-write/1-read memory 100 with buffered write requests. Although the diagrams depict components as functionally separate, such depiction is merely for illustrative purposes. It will be apparent that the components portrayed in this figure can be arbitrarily combined or divided into separate software, firmware and/or hardware components.

In the example of FIG. 1, the n-write/1-read memory 100 includes a memory unit 102, which is further divided into a plurality of (n) permanent memory banks (B0, . . . , Bn) 104 according to the number of (n) write interfaces, wherein each of the memory banks 104 has one write port 106 and one read port 108 for writing data to and reading data from the memory bank 104, respectively. Here, each of the memory banks 104 can be of a variety of memory types that include but are not limited to static random-access memory (SRAM) and/or ternary content-addressable memory (TCAM). Each memory bank 104 is of a certain size/depth (e.g., 1024 memory rows/cells/locations) wherein each memory row is accessible by a memory row address. Each memory cell can maintain data of a certain width (e.g., 40 bits wide), wherein the data can be but is not limited to a counter associated with the memory cell at the memory row address.

In the example of FIG. 1, the n-write/1-read memory 100 includes a plurality of (n) write interfaces 110 for accepting and presenting concurrent write requests/instructions Wr_0, . . . , Wr_(n−1), from their corresponding pipelines to the memory unit 102 for a write operation, a read interface 118 for carrying a read request Rd to and to read data RdData from the memory unit 102 for a read operation. In some embodiments, each write request Wr_k includes an address portion, wAddr_k, which is the memory address of a memory bank 104 to be accessed, and a data portion, wData_k, which is the data to be written/incremented to the memory address. The first write request Wr_0 is coupled directly to a crossbar 116 while each write request Wr_k (k>0) is coupled and provided to a set 112 of k memory modules 114, Mk0, . . . , Mk(k−1) connected in a sequence before reaching the crossbar 116 as discussed in details below.

In the example of FIG. 1 the n-write/1-read memory 100 further includes a crossbar 116 configured to receive the first write request Wr_0 directly or fetch write requests Wr_k (k>0) from one of the memory modules in the set 112 of the k memory modules 114 coupled to Wr_k, k=1, . . . , n−1. The crossbar 116 is then configured to route each of the write requests received to one of the memory banks 104 in the memory unit 102 for a write operation according to the memory address specified in the write request. Although the crossbar 106 may serve the write requests from multiple write interfaces 110 in parallel at the same time, the crossbar 106 is configured to ensure that each of the memory banks 104 is accessed to serve at most one write request Wr_k during each clock cycle when more than one of the write requests are requesting to access the same memory bank 104 at the same time.

Although each write interface 110 may or may not present a write request to the crossbar 116, but if it does so, it should not conflict with write requests from other write interfaces to achieve parallel access to the memory banks 104 at any time. To this end, the n-write/1-read memory 100 is optimally designed to prioritize the write requests Wr_k based on their ordering k from 0 to n. In some embodiments, as shown in the example of FIG. 1, the first write request Wr_0 has the highest priority and is always presented by its write interface to the crossbar 116 directly in the form of cb0, while write request Wr_k (k>0) is fed through a set 112 of k temporary memory modules 114, Mk0, . . . , Mk(k−1), before being presented to the crossbar 116 in the form of cbk. Under the configuration, the lower the priority of Wr_k (the higher the value of k), the longer the set 112 of memory modules 114 (k in length) Wr_k needs to pass through before reaching the crossbar 116.

Under the optimized design of the n-write/1-read port memory 100 discussed above, the total number of memory banks/modules utilized in the n-write/1-read memory 100 equals n, which is the number of memory banks 104 in the memory unit 102, plus 1+, . . . , +n−1=n(n−1)/2, which is the total number of memory modules 114. For the example depicted in FIG. 1, the total number of memory banks/modules utilized in the n-write/1-read port memory 100 is 4+6=10, which is far less than the number of memory banks/modules n*n that would have been used by replicating the memory units 102 for each of the write requests (4*4=16 in that case). The larger the number (n) of write requests from the pipelines, the bigger the savings in terms of the number of memory banks/modules used, which directly corresponds to the area of the n-write/1-read memory 100.

In some embodiments, each memory module 114 in the set 112 of k temporary memory modules (e.g., Mkj, j=0, . . . , k−1) is configured to buffer the write request Wr_k when Wr_k cannot be written to one of the memory banks 104 during the current clock cycle due to conflict with one of write requests having higher priorities (e.g., Wr_0, Wr_(k−1)). In some embodiments, each memory module 114 has the same size/depth as each of the memory banks 104. The width (number of bits in each row) of each memory module 114 equals to the width of the each memory bank 104 (e.g., 40 bits) plus $\log_2 n$ (e.g., 2 when n=4 as shown in FIG. 1) bits, wherein the additional $\log_2 n$ bits record order number of one of the higher priority write requests the write request Wr_k conflicts with.

Figure 2:
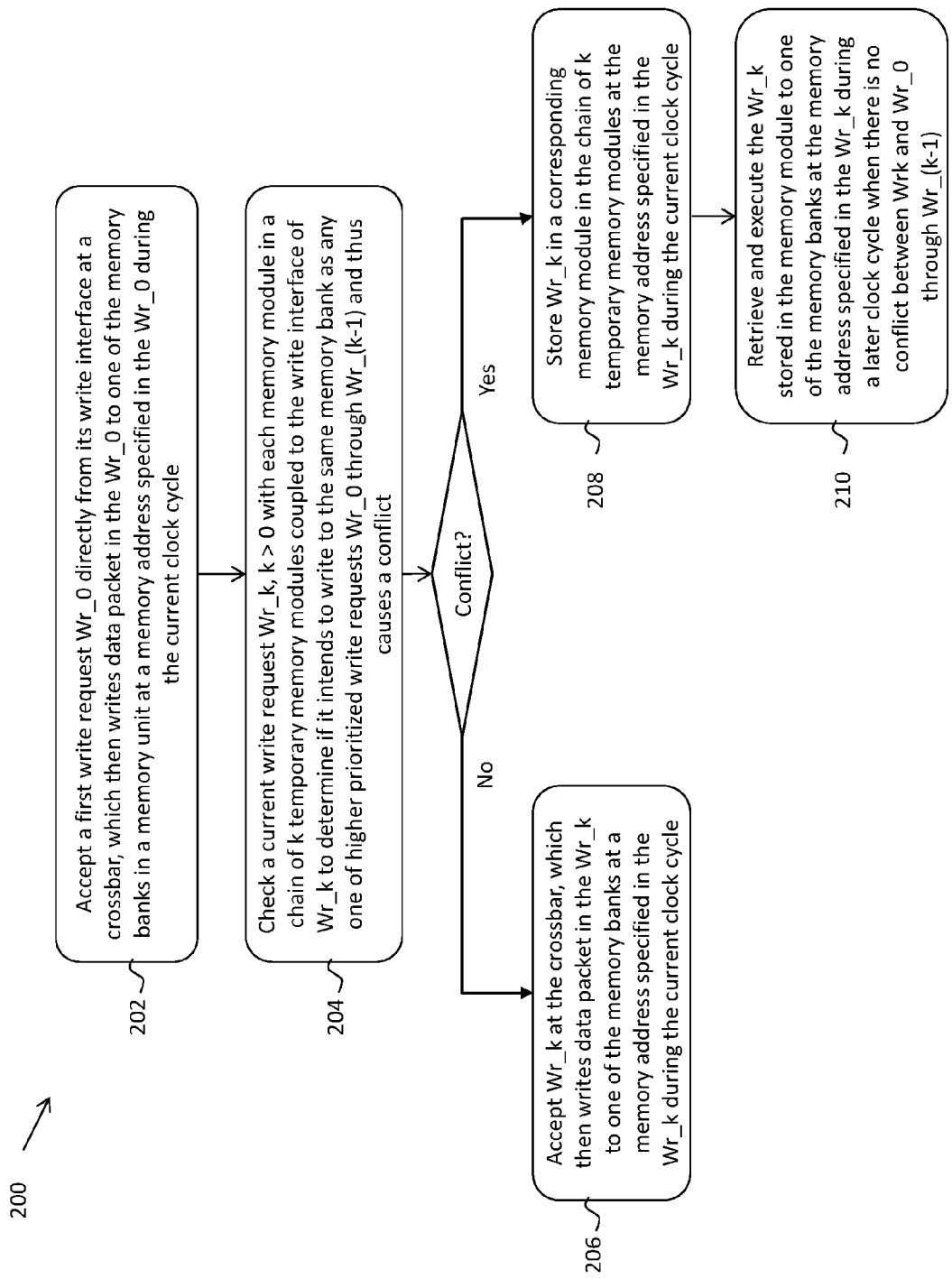
FIG. 2 depicts a flowchart of an example of a process to support write operations to an optimized design of n-write/1-read memory with buffered write requests in accordance with some embodiments.

FIG. 2 depicts a flowchart of an example of a process to support write operations to an optimized design of n-write/1-read memory 100 with buffered write requests. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a write request Wr_0 is accepted directly from its write interface at the crossbar 116, which then writes data packet in the Wr_0 to one of the memory banks 104 in the memory unit 102 at the memory address specified in the Wr_0 during the current clock cycle. The flowchart 200 continues to block 204, where a current write request Wr_k, k>0, is received and checked with each memory module in a set 112 of k temporary memory modules (e.g., Mk0 through Mk(k−1)) coupled to the write interface of Wr_k to determine if it intends to write to the same memory bank 104 as any one of higher prioritized write requests Wr_0 through Wr_(k−1) and thus causes a conflict. If there is no conflict, i.e., Wr_k is writing to a different memory bank from the write requests Wr_0 through Wr_(k−1), the flowchart 200 continues to block 206, where Wr_k is accepted at the crossbar 116, which then writes the data packet in the Wr_k to one of the memory banks 104 at the memory address specified in the Wr_k during the current clock cycle. If there is conflict, i.e., Wr_k is writing to the same memory bank as write request Wr_i among Wr_0 through Wr_(k−1), the flowchart 200 continues to block 208, where Wr_k is stored in the corresponding memory module Mki in the set 112 of k temporary memory modules at the memory address specified in the Wr_k during the current clock cycle. The flowchart 200 ends at block 210, where the Wr_k stored in the memory module Mki is retrieved and executed (its data written) to one of the memory banks 104 at the memory address specified in the Wr_k during a later clock cycle when there is no conflict between Wrk and Wr_0 through Wr_(k−1).

Figure 3:
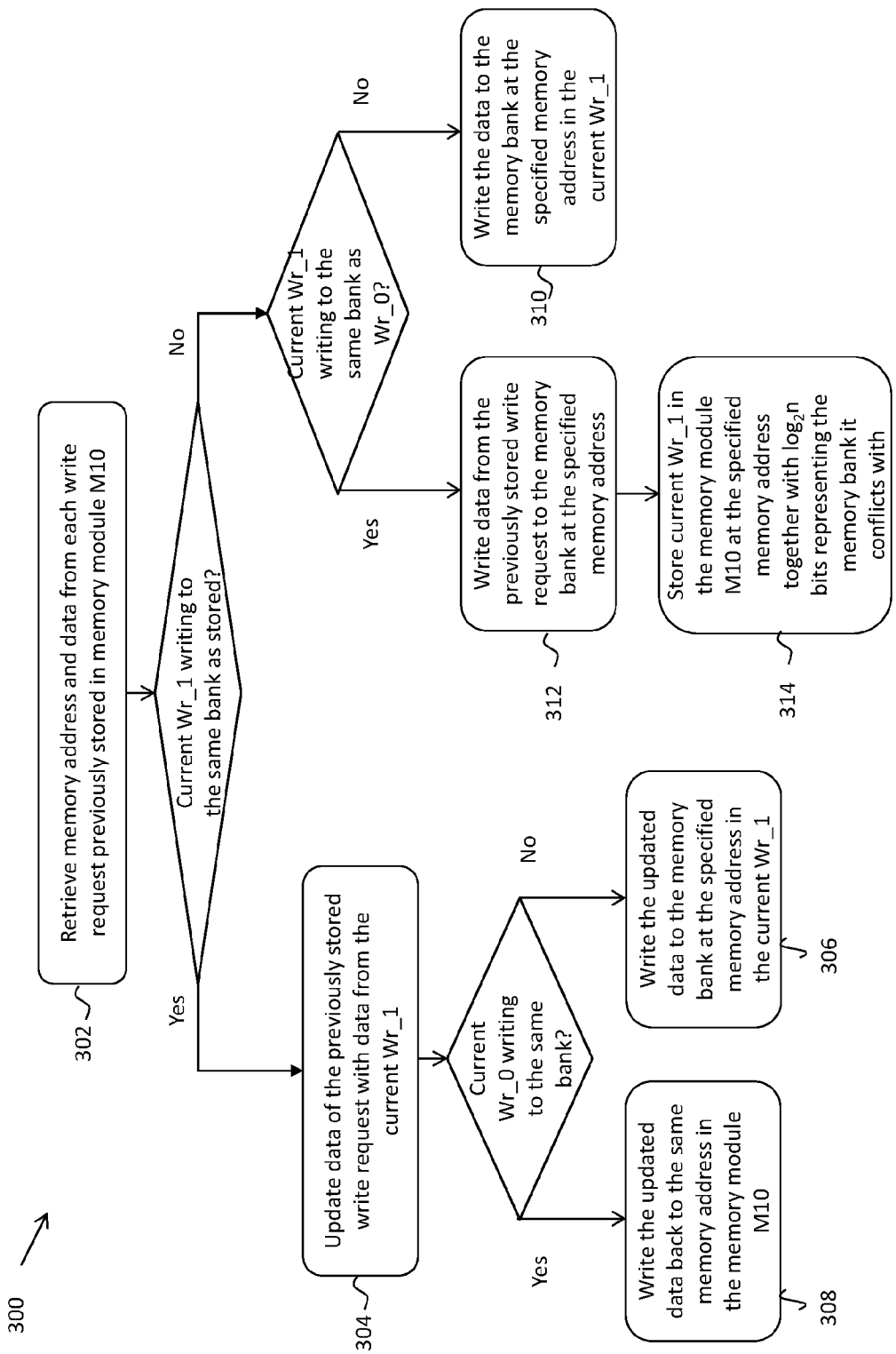
FIG. 3 depicts a flowchart of an example of a process to perform conflict check for the second write request Wr_1 based on the optimized design of n-write/1-read memory with buffered write requests in accordance with some embodiments.

FIG. 3 depicts a flowchart of an example of a process to perform conflict check for the second write request Wr_1 based on the optimized design of n-write/1-read memory 100 with buffered write requests. Although Wr_1 is used here as a non-limiting example, one skilled in the relevant art will appreciate that the same/similar approach may be adapted to check conflict for any write request Wr_k, k>0.

In the example of FIG. 3, the flowchart 300 starts at block 302, where once the current Wr_1=(wAddr1, WData1) is received at memory module M10, (memory bank #, data) pair of a previously stored write request Wr_1 is retrieved from the memory module M10 by its set 112 based on the specified memory address wAddr1 in the Wr_1. If the current write request Wr_1 is writing to the same memory bank as the previously stored Wr_1, the flowchart 300 continues to block 304, where data retrieved from the memory module M10 is updated/incremented with WData1 from the current Wr_1 by the set 112. If the current Wr_1 is not writing to the same memory bank as a concurrent Wr_0, indicating there is no conflict, the flowchart 300 continues to block 306, where the updated data is presented to the crossbar 116, which then writes to the memory bank at the specified memory address in the current Wr_1. Otherwise (there is a conflict), the flowchart 300 continues to block 308, where the updated data is written back to the same memory address wAddr1 in the memory module M10 by its set 112. If the current Wr_1 is writing to a different memory bank from the previously stored Wr_1, which is also different from the memory bank in the concurrent Wr_0, the flowchart 300 continues to block 310, where data in the current Wr_1 is presented to the crossbar 116, which then writes it to the memory bank at the specified memory address during the current clock cycle. If the current Wr_1 is writing to a different memory bank from the previously stored Wr_1, but is the same as the memory bank in the concurrent Wr_0, the flowchart 300 continues to block 312, where data from the previously stored Wr_1 is presented to the crossbar 116, which then writes it to the memory bank at the memory address specified in the previously stored Wr_1 during the current clock cycle. The flowchart 300 ends at block 314, where the current Wr_1 is stored in the memory module Mk0 at the memory address specified in the Wr_1 together with two bits representing the memory bank in the concurrent write request Wr_0 it conflicts with.

As shown by the discussions above, data from write requests may be stored either permanently in the memory banks 104 of the memory unit 102, or temporarily in the memory modules 114 when there are conflicts among the write requests. As a result, when a read request Rd including a read address of a memory address rAddr is received at a read interface 118 for a read operation to the n-write/1-read memory 100, data needs to be retrieved from both the memory banks 104 and the memory modules 114.

Figure 4:
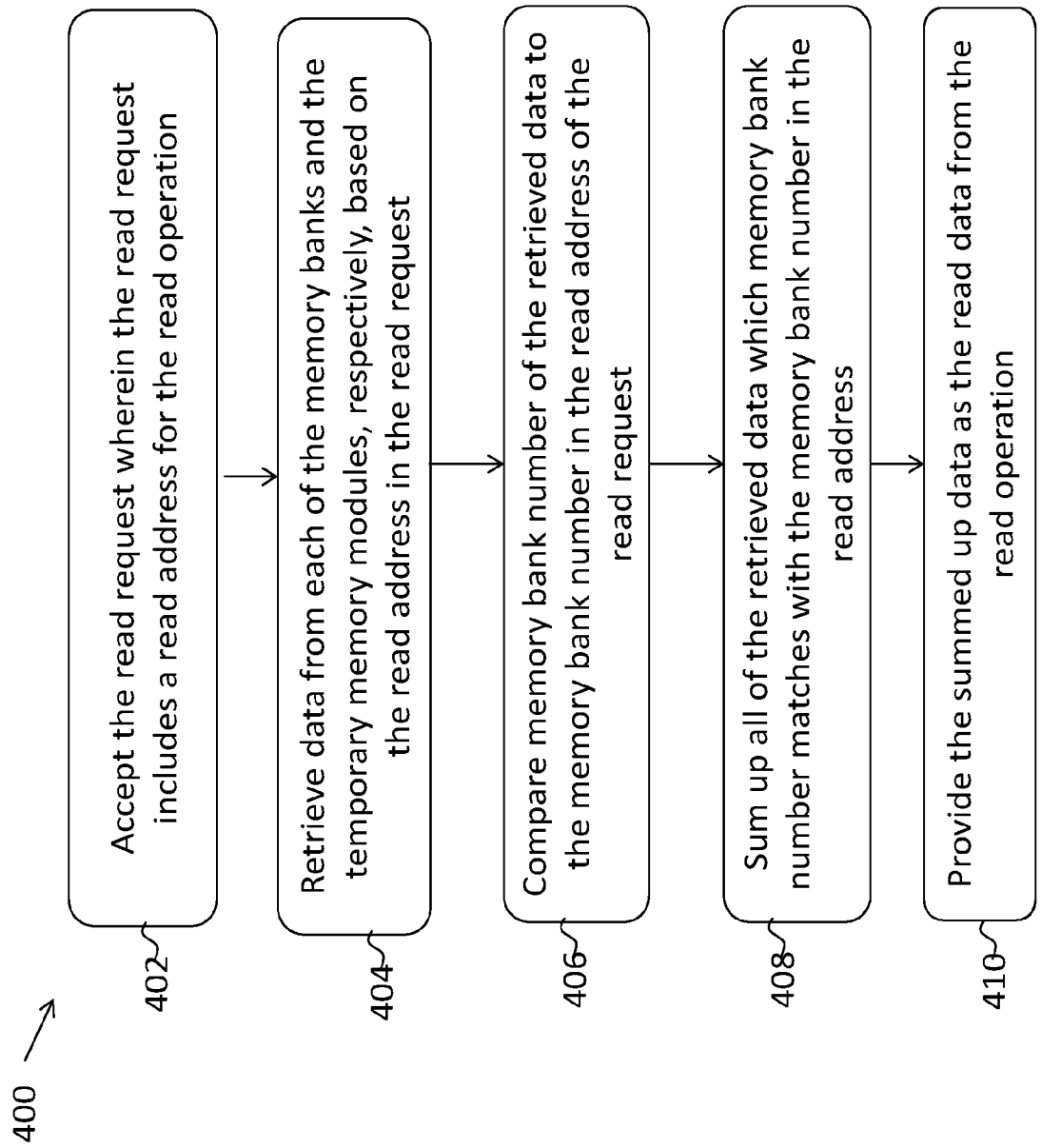
FIG. 4 depicts a flowchart of an example of a process to support a read operation to an optimized design of n-write/1-read memory with buffered write requests in accordance with some embodiments.

FIG. 4 depicts a flowchart of an example of a process to support a read operation to an optimized design of n-write/1-read memory 100 with buffered write requests. In the example of FIG. 4, the flowchart 400 starts at block 402, where a read request is accepted at a read interface of the memory, wherein the read request includes a read address (including the memory bank # and the memory address in the memory bank) for a read operation. The flowchart 400 continues to block 404, where data is retrieved from each of the permanent memory banks 104 and the temporary memory modules 114, respectively, based on the read address in the read request. The flowchart 400 continues to block 406, where memory bank number of all of the retrieved data are compared to the memory bank number in the read address of the read request. The flowchart 400 continues to block 408, where all of the retrieved data which memory bank number matches with the memory bank number in the read address are summed up by the summation circuit 120. The flowchart 400 ends at block 410, where the summed up data is provided as the read data from the read operation via the read interface 118.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An optimized design of n-write/1-read port memory with buffered write requests, comprising:
    a memory unit including a plurality of (n) memory banks each having one write port and one read port configured to write data to and read data from the memory banks, respectively;
    a plurality of (n) write interfaces configured to carry concurrent write requests Wr_0, . . . , Wr_(n−1) from their corresponding pipelines to the memory unit for a write operation, wherein the first write request Wr_0 is always presented by its write interface directly to a crossbar, wherein the write requests Wr_k (k>0) are each fed through a set of k temporary memory modules, Mk0, . . . , Mk(k−1) connected in a sequence before being presented to the crossbar;
    said crossbar configured to
        accept the first write request Wr_0 directly and fetch the write requests Wr_k (k>0) from one of the memory modules in the set of the k memory modules coupled to Wr_k;
        route each of the write requests to one of the memory banks in the memory unit for a write operation according to data and a memory address specified in the write request.

2. The memory of claim 1, wherein:
the crossbar is configured to serve the write requests from multiple write interfaces in parallel at the same time.

3. The memory of claim 1, wherein:
each of the memory banks is configured to serve at most one of the write requests during each clock cycle when more than one of the write requests are requesting to access the same memory bank at the same time.

4. The network switch of claim 1, wherein:
each of the memory modules has the same number of memory rows as each of the memory banks.

5. The memory of claim 1, wherein:
the write requests are prioritized based on their ordering from 0 to n, with the first write request Wr_0 having the highest priority.

6. The memory of claim 5, wherein:
each memory module in the set of k temporary memory modules is configured to buffer the write request Wr_k when Wr_k cannot be written to one of the memory banks during the current clock cycle due to conflict with one of the write requests having higher priorities.

7. The memory of claim 6, wherein:
width of each memory module in the set of k temporary memory modules equals to the width of the each of the memory banks plus $\log_2 n$ bits, wherein the $\log_2 n$ bits record order number of one of the higher priority write requests the write request Wr_k conflicts with.

8. The memory of claim 1, further comprising:
a read interface configured to carry a read request to and to read data from the memory for a read operation.

9. The memory of claim 8, wherein:
the read interface is configured to retrieve data from both the memory banks and the memory modules for the read operation.

10. The memory of claim 9, wherein:
the read interface is configured to
    accept the read request wherein the read request includes a read address for the read operation;
    retrieve data from each of the memory banks and the temporary memory modules, respectively, based on the read address in the read request;

compare memory bank number of the retrieved data to the memory bank number in the read address of the read request;

sum up all of the retrieved data which memory bank number matches with the memory bank number in the read address;

provide the summed up data as the read data from the read operation.

11. A method to support write operations to an optimized design of n-write/1-read memory with buffered write requests, comprising:

accepting a first write request Wr_0 directly from its write interface at a crossbar, which then writes data packet in the Wr_0 to one of the memory banks in a memory unit at a memory address specified in the Wr_0 during the current clock cycle;

checking a current write request Wr_k, k>0 with each memory module in a set of k temporary memory modules coupled to the write interface of Wr_k to determine if it intends to write to the same memory bank as any one of higher prioritized write requests Wr_0 through Wr_(k−1) and thus causes a conflict;

accepting Wr_k at the crossbar, which then writes data packet in the Wr_k to one of the memory banks at a memory address specified in the Wr_k during the current clock cycle if Wr_k is writing to a different memory bank from the write requests Wr_0 through Wr_(k−1);

storing Wr_k in a corresponding memory module in the set of k temporary memory modules at the memory address specified in the Wr_k during the current clock cycle if Wr_k is writing to the same memory bank as one of the write requests Wr_0 through Wr_(k−1);

retrieving and executing the Wr_k stored in the memory module to one of the memory banks at the memory address specified in the Wr_k during a later clock cycle when there is no conflict between Wrk and Wr_0 through Wr_(k−1).

12. The method of claim 11, further comprising:
retrieving memory address and data from each write request previously stored in each memory module in a set of k temporary memory modules when checking conflict with the current write request Wr_k.

13. The method of claim 12, further comprising:
updating data of the previously stored write request retrieved from the memory module with data from the current Wr_k if the current write request Wr_k is writing to the same memory bank as the previously stored write request.

14. The method of claim 13, further comprising:
writing the updated data to the memory bank at the specified memory address in the current Wr_k if the current Wr_k is not writing to the same memory bank as one of the concurrent write requests Wr_0 through Wr_(k−1).

15. The method of claim 13, further comprising:
writing the updated data back to the same memory address in the memory module if the current Wr_k is writing to the same memory bank as one of the concurrent write requests Wr_0 through Wr_(k−1).

16. The method of claim 12, further comprising:
writing data in the current Wr_k to the memory bank at the specified memory address in the current Wr_k during the current clock cycle if the current Wr_k is writing to a different memory bank from the previously stored Wr_k, which is also different from the memory bank in any of the concurrent write requests Wr_0 through Wr_(k−1).

17. The method of claim 12, further comprising:
writing data from the previously stored write request to the memory bank at the memory address specified in the previously stored write request during the current clock cycle if the current Wr_k is writing to a different memory bank from the previously stored write request but is the same as the memory bank in any of the concurrent write requests Wr_0 through Wr_(k−1).

18. The method of claim 17, further comprising:
storing current Wr_k in the memory module at the memory address specified in the Wr_k together with $\log_2 n$ bits representing the memory bank in the one of the concurrent write requests Wr_0 through Wr_(k−1) it conflicts with.

19. The method of claim 11, further comprising:
retrieving data from both the memory banks and the memory modules for a read operation.

20. The method of claim 19, further comprising:
accepting the read request wherein the read request includes a read address for the read operation;

retrieving data from each of the memory banks and the temporary memory modules, respectively, based on the read address in the read request;

comparing memory bank number of the retrieved data to the memory bank number in the read address of the read request;

summing up all of the retrieved data which memory bank number matches with the memory bank number in the read address;

providing the summed up data as the read data from the read operation.

* * * * *